United States Patent
Kim et al.

(10) Patent No.: US 12,512,555 B2
(45) Date of Patent: Dec. 30, 2025

(54) BATTERY MODULE WITH THERMAL PROPAGATION PREVENTION STRUCTURE OF BATTERY CELL USING COOLANT AND BATTERY PACK COMPRISING THE SAME

(71) Applicant: LG ENERGY SOLUTION, LTD., Seoul (KR)

(72) Inventors: Seung-Joon Kim, Daejeon (KR); Eun-Gyu Shin, Daejeon (KR); Jae-Min Yoo, Daejeon (KR); Young-Bum Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 513 days.

(21) Appl. No.: 18/021,480

(22) PCT Filed: Mar. 17, 2022

(86) PCT No.: PCT/KR2022/003717
§ 371 (c)(1),
(2) Date: Feb. 15, 2023

(87) PCT Pub. No.: WO2022/203278
PCT Pub. Date: Sep. 29, 2022

(65) Prior Publication Data
US 2023/0291064 A1 Sep. 14, 2023

(30) Foreign Application Priority Data
Mar. 23, 2021 (KR) .................. 10-2021-0037564

(51) Int. Cl.
*H01M 50/342* (2021.01)
*H01M 10/6556* (2014.01)
(Continued)

(52) U.S. Cl.
CPC ... *H01M 50/3425* (2021.01); *H01M 10/6556* (2015.04); *H01M 10/6568* (2015.04); *H01M 50/211* (2021.01)

(58) Field of Classification Search
CPC .. H01M 50/30; H01M 50/317; H01M 50/325; H01M 50/333; H01M 50/342;
(Continued)

(56) References Cited

U.S. PATENT DOCUMENTS 9,912,021 B2 3/2018 Andres
2014/0170447 A1 6/2014 Woehrle et al.
(Continued)

FOREIGN PATENT DOCUMENTS

CN 112531231 A 3/2021
EP 2 302 727 A1 3/2011
(Continued)

OTHER PUBLICATIONS

International Search Report for PCT/KR2022/003717 (PCT/ISA/210) mailed on Jun. 20, 2022.
(Continued)

*Primary Examiner* — Amanda J Barrow
(74) *Attorney, Agent, or Firm* — Birch, Stewart, Kolasch & Birch, LLP (57) ABSTRACT

A battery module includes a plurality of battery cells; and a module case accommodating the plurality of battery cells, wherein the module case include an upper plate positioned on the plurality of battery cells and a lower plate positioned below the plurality of battery cells, each having a channel in which a coolant flows, the upper plate and the lower plate include a melting spot which melts when heated in a first plate in contact with the plurality of battery cells, and the upper plate includes a vent hole and a first sealing cap in a second plate which faces the first plate, the vent hole through (Continued)

which gas is forced out, and the first sealing cap configured to seal the vent hole and made of a thermomeltable material.

12 Claims, 11 Drawing Sheets

(51) Int. Cl.
*H01M 10/6568* (2014.01)
*H01M 50/211* (2021.01)

(58) Field of Classification Search
CPC ............ H01M 50/3425; H01M 10/60; H01M 10/613; H01M 10/617; H01M 10/65; H01M 10/655; H01M 10/6554; H01M 10/6556; H01M 10/6557; H01M 10/6566; H01M 10/6567; H01M 10/6568
See application file for complete search history.

(56) References Cited

U.S. PATENT DOCUMENTS

| | | |
|---|---|---|
| 2014/0342201 A1 | 11/2014 | Andres |
| 2018/0212287 A1 | 7/2018 | Hong et al. |
| 2018/0358593 A1 | 12/2018 | Seo et al. |
| 2019/0077276 A1 | 3/2019 | Capati et al. |
| 2021/0005943 A1 | 1/2021 | Park et al. |
| 2021/0226290 A1 | 7/2021 | Lee |
| 2022/0045386 A1 | 2/2022 | Jo |
| 2022/0294052 A1 | 9/2022 | Kwon et al. |

FOREIGN PATENT DOCUMENTS

| | | |
|---|---|---|
| JP | 2010-040420 A | 2/2010 |
| JP | 2010-62130 A | 3/2010 |
| KR | 10-2012-0015900 A | 2/2012 |
| KR | 10-1583679 B1 | 1/2016 |
| KR | 10-1636413 B1 | 7/2016 |
| KR | 10-2018-0006150 A | 1/2018 |
| KR | 10-2023716 B1 | 9/2019 |
| KR | 10-2020-0041708 A | 4/2020 |
| KR | 10-2020-0131618 A | 11/2020 |
| KR | 10-2021-0006570 A | 1/2021 |
| KR | 10-2021-0015327 A | 2/2021 |
| WO | WO 2020/208527 A1 | 10/2020 |
| WO | WO 2021/004860 A1 | 1/2021 |

OTHER PUBLICATIONS

Extended European Search Report for European Application No. 22775980.0, dated Feb. 15, 2024.

BATTERY MODULE WITH THERMAL PROPAGATION PREVENTION STRUCTURE OF BATTERY CELL USING COOLANT AND BATTERY PACK COMPRISING THE SAME

TECHNICAL FIELD

The present disclosure relates to a battery module, and more particularly, to a battery module with thermal propagation prevention structure having a path for feeding a coolant to a battery cell in which a fire occurred and forcing high temperature gas out to stop the spread of the fire to other battery cells in the initial stage and prevent flame propagation.

The present application claims the benefit of Korean Patent Application No. 10-2021-0037564 filed on Mar. 23, 2021 with the Korean Intellectual Property Office, the disclosure of which is incorporated herein by reference in its entirety.

BACKGROUND ART

Secondary batteries are gaining attention for their primary advantage of remarkably reducing the use of fossil fuels and not generating by-products from the use of energy, making it a new eco-friendly and energy efficient source of energy.

Accordingly, secondary batteries are increasingly used in a wide range of device applications. For example, secondary batteries are widely used not only as an energy source of multifunctional small devices including wireless mobile devices or wearable devices but also an energy source of electric vehicles and hybrid electric vehicles proposed as an alternative to the existing gasoline vehicles and diesel vehicles or energy storage systems (ESSs).

In general, secondary batteries have an operating voltage of about 2.5V to 4.5V. Accordingly, electric vehicles or energy storage systems requiring large capacity and high output use battery packs as an energy source, and the battery pack includes battery modules connected in series and/or in parallel, each battery module including a plurality of secondary batteries connected in series and/or in parallel.

As secondary batteries are used as a large capacity and high output energy source, ensuring the safety of the battery modules/packs is an important issue.

The state-of-the-art battery modules are designed such that a large number of secondary batteries are densely packed to improve the energy density, and in case that a fire occurs due to a failure in one of the secondary batteries, they are prone to thermal runaway propagation to adjacent secondary batteries. By this reason, the battery modules and the battery packs include a cooling system and a fire extinguishing system.

Currently, when a fire occurred in a secondary battery, fire extinguishing systems configured to detect the fire using a gas sensor and feed water into the battery pack or the battery module have been developed in the corresponding industry, but they fail to stop the spread of the fire to other secondary batteries at the initial stage due to a predetermined time difference until water contacts the secondary battery in which the fire occurred for the first time since a water valve has been opened.

Meanwhile, high temperature gas generated from the secondary battery in which the fire triggers the rapid transfer of heat to other secondary batteries. However, in general, compared to air-cooled battery modules, water-cooled battery modules have an air-tight structure, so they fail to smoothly force high temperature gas out, and thermal propagation to secondary batteries occurs faster.

DISCLOSURE

Technical Problem

The present disclosure is designed to solve the above-described technical problem, and therefore the present disclosure is directed to providing a battery module for quickly feeding a coolant to a battery cell in which a fire occurred and smoothly forcing venting gas out.

The technical problem of the present disclosure to be solved is not limited to the above-mentioned problem, and these and other problems will be clearly understood by those skilled in the art from the following description.

Technical Solution

According to the present disclosure, there is provided a battery module including a plurality of battery cells; and a module case accommodating the plurality of battery cells, wherein the module case includes an upper plate positioned on the plurality of battery cells and a lower plate positioned below the plurality of battery cells, each of the upper plate and lower plate have a first plate and a second plate forming a channel in which a coolant flows, each of the upper plate and the lower plate include a melting spot which melts when heated in the first plate, and the upper plate includes a vent hole and a first sealing cap in the second plate through which gas is forced out, and the first sealing cap is configured to seal the vent hole and is made of a thermomeltable material.

The vent hole may be provided with a mesh structure.

The vent hole may be formed over a region of the second plate along the channel.

The upper plate and the lower plate may comprise a heatsink.

The first plate and the second plate may be made of aluminum (Al), or the first plate may be made of aluminum (Al) and the second plate may be made of steel.

The melting spot may include a first melting spot in the upper plate and a second melting spot in the lower plate, and the first melting spot and the second melting spot may be arranged at vertically symmetric locations with the at least one battery cell interposed between.

The melting spot may include a through-hole in the first plate and a second sealing cap configured to seal the through-hole and made a thermomeltable material, and the through-hole and the second sealing cap may be provided at a predetermined interval along the channel.

The second sealing cap may include a body which is disposed in the through-hole; and a top flange and a bottom flange horizontally extended from top and bottom of the body to cover an upper surface and a lower surface of the first plate, respectively.

The top flange and the bottom flange may have at least one protrusion in a direction facing each other, and the first plate may have a groove of a shape which matches the protrusion.

The protrusion may have any one of triangular, trapezoidal, rectangular and semicircular shapes in cross section.

According to another aspect of the present disclosure, there is provided a battery pack including at least one battery module described above.

The battery module may have a coolant inlet and a coolant outlet in the upper plate.

Advantageous Effects

According to an aspect of the present disclosure, when a fire occurs in a certain battery cell, the sealing cap adjacent to the corresponding battery cell melts to immediately feed a coolant to the corresponding battery cell. Accordingly, it is possible to prevent thermal propagation in the battery module quickly and effectively.

Additionally, according to another aspect of the present disclosure, after the coolant of the upper plate is supplied to the battery cell in which the fire occurred, the channel of the upper plate may be used as a gas exit passage. High temperature gas may flow along the channel of the upper plate and exit through the vent hole of the upper plate.

Additionally, the vent hole is formed with a mesh structure, thereby preventing the propagation of blazing flames with the high temperature gas.

Additionally, the upper plate and the lower plate of the module case of the present disclosure comprise a heatsink. The heatsink performs a cooling function in normal condition and a fire extinguishing function in emergency. That is, the cooling system and the fire extinguishing system are operated in combination by the same component. Accordingly, it is possible to improve the energy density of the battery module, reduce the number of components and achieve cost savings.

The effects of the present disclosure are not limited to the above-mentioned effects, and these and other effects will be clearly understood by those skilled in the art from the present disclosure and the accompanying drawings.

BEST MODE

Hereinafter, exemplary embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and the illustrations shown in the drawings are some exemplary embodiments of the present disclosure, but not intended to fully describe the technical aspects of the present disclosure, so it should be understood that a variety of other equivalents and modifications could have been made thereto at the time that the application was filed.

A battery module 10 according to an embodiment of the present disclosure includes a cell stack including a plurality of battery cells 100 and a module case 200 accommodating the cell stack.

The battery cell 100 may include a pouch-type battery cell 100. The pouch-type battery cell 100 is an approximately plate-shaped battery cell 100 including a hermetically sealed pouch-type case in which an electrode assembly and an electrolyte solution are received, and it is well known at the filing date of the present disclosure and its detailed description is omitted.

Each of the pouch-type battery cells 100 standing in the vertical direction (±Z) is stacked such that wide surfaces face each other in the horizontal direction (±Y) to form a cell stack. A buffer pad or a thin-film type cooling pin may be interposed between the pouch-type battery cells 100 to absorb swelling or transfer heat.

The battery cells 100 may be swollen by the expansion and contraction of the electrode assembly and gas generated as charging/discharging by-products in the repeated charging/discharging process. The battery module 10 may further include a barrier 300 of a hollow structure (see FIG. 6) between the battery cells 100 to absorb the swelling of the battery cells 100 and minimize the deformation of the module case 200.

As described below in detail, the battery module 10 of this embodiment may be configured such that each of the top edge and bottom edge of the pouch-type battery cells 100 is secured to the module housing with a thermally conductive adhesive and a coolant W1 is brought into indirect contact with the battery cells 100 to cool the battery cells 100.

Meanwhile, although this embodiment shows the pouch-type battery cells 100, cylindrical or prismatic battery cells 100 may be used as an alternative to the pouch-type battery cells.

Figure 1:
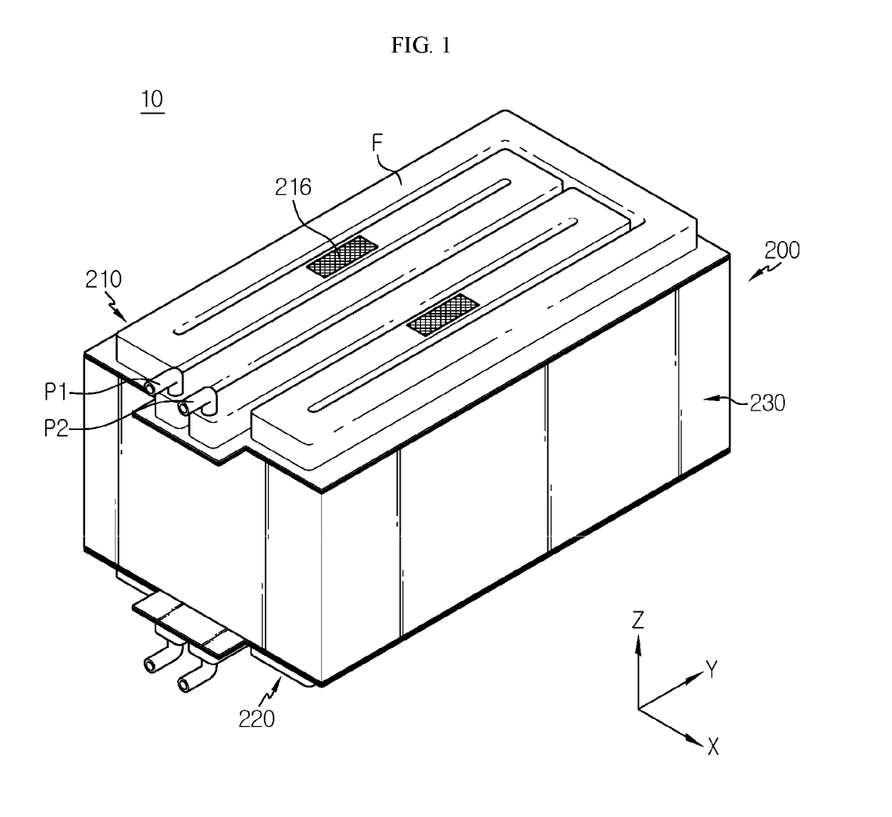
FIG. 1 is a schematic perspective view of a battery module according to an embodiment of the present disclosure.

The module case 200 may be made of a material having high mechanical strength to receive the cell stack and protect it from the external impacts or vibrations and may be approximately in the shape of a six-sided box. For example, as shown in FIG. 1, the module case 200 of this embodiment may be formed in the shape of a six-sided box including an upper plate 210 positioned on the cell stack, a lower plate 220 positioned below the cell stack and a wall frame 230 disposed around the cell stack. Although briefly shown, the wall frame may be an assembly of four plates including front/rear cover plates that cover the front side and the rear side of the cell stack and a pair of side plates that cover the sides of the cell stack.

In particular, in the module case 200 of the present disclosure, the upper plate 210 and the lower plate 220 comprise a heatsink to effectively cool the battery cells 100 in a normal condition and stop fires in the battery cells 100 quickly in emergency. Here, the heatsink refers to a cooling component having a channel in which the coolant W1 flows to absorb heat.

In general, in the case of the conventional water-cooled battery module, the heatsink is a separate component from the module case and is positioned below the lower plate of the module case. However, the battery module 10 according to this embodiment includes the module case 200 integrally formed with the heatsink, and the upper plate 210 and the lower plate 220 of the module case 200 correspond to the heatsink. By this configuration of the module case 200, it is possible to reduce the path along which heat from each battery cell 100 is transferred to the heatsink, reduce the number of heat transfer components and increase the energy density of the battery module 10.

The structure of the upper plate 210 and the lower plate 220 of the module case 200 and the battery module 10 for the cooling and fire extinguishing of the battery cells 100 will be described below in detail with reference to FIGS. 2 to 8.

Figure 2:
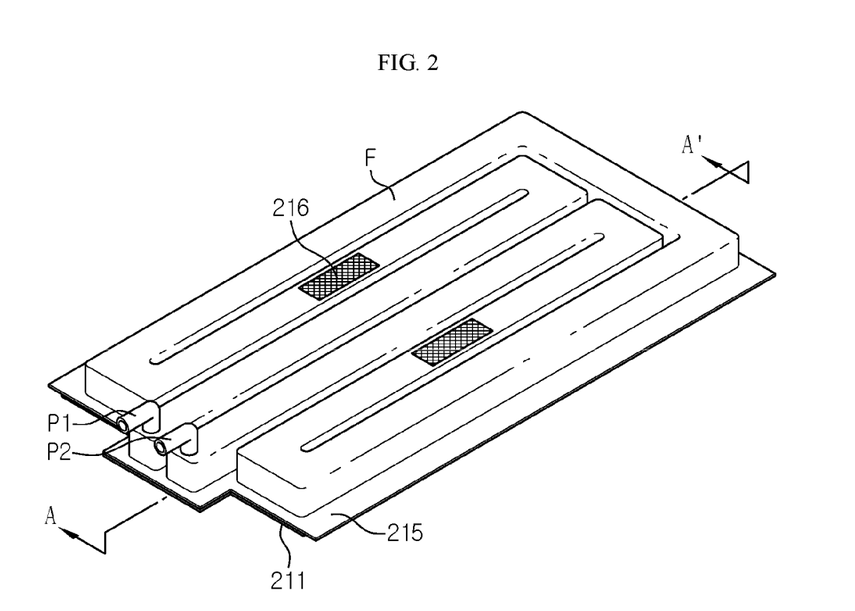
FIG. 2 is a schematic perspective view of an upper plate of a module case of FIG. 1.
Figure 3:
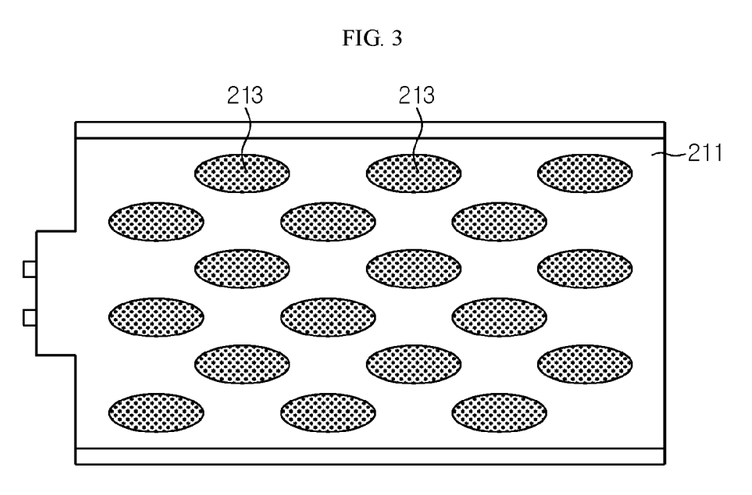
FIG. 3 is a bottom view of the upper plate of FIG. 2.
Figure 4:
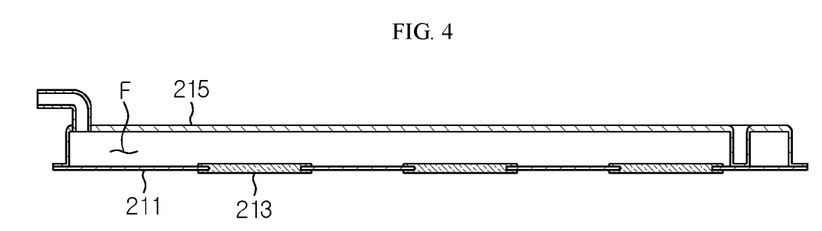
FIG. 4 is a cross-sectional view of FIG. 2 taken along the line A-A'.

Referring to FIGS. 2 to 4, the upper plate 210 of the module case 200 may be a heatsink including a first plate 211 and a second plate 215, and a channel F between the first plate 211 and the second plate 215. The lower plate 220 of the module case 200 may be the same as the upper plate 210 except a vent hole 216 as described below.

The first plate 211 may be positioned in contact with the battery cells 100 and made of aluminum (Al) having high thermal conductivity, and the second plate 215 may be made of steel having high stiffness. The first plate 211 and the second plate 215 of dissimilar materials may be joined, for example, by braze welding.

As the heatsink is fabricated by dissimilar materials joining of the aluminum first plate 211 and the steel second plate 215, it is possible to prevent damage such as perforation in the outer side of the heatsink by high temperature gas and particles. However, the scope of protection of the present disclosure is not limited to the heatsink fabricated by dissimilar materials joining of aluminum and steel. That is, in the fabrication of the heatsink, for easy fabrication process and light weight, both the first plate 211 and the second plate 215 may be made of aluminum or any other material having light weight and high stiffness may be used.

The channel F may be defined as a sealed space created by joining the second plate 215 having a convex pattern shown in FIG. 2 on one surface of the flat first plate 211. An inlet port P1 and an outlet port P2 may be detachably connected to one side and the other side of the channel F, respectively.

The coolant W1 may be supplied to the channel F through the inlet port P1 and exit through the outlet port P2. Although this embodiment describes the inlet port P1 and the outlet port P2 installed at both the upper plate 210 and the lower plate 220, for example, the upper plate 210 may be filled with the coolant W1 and the inlet port P1 and the outlet port P2 may not be connected. In this case, the upper plate 210 may be used like a water tank that stores a predetermined amount of coolant W1.

By the above-described configuration, heat generated from the battery cells 100 may be dissipated through two paths. That is, the heat of the battery cells 100 may be transferred in an order of "the top edge of the battery cells 100=>the aluminum first plate 211 of the upper plate 210=>the coolant W1" and "the bottom edge of the battery cells 100=>the aluminum first plate 211 of the lower plate 220=>the coolant W1". Accordingly, the battery module 10 of the present disclosure may be effective in quickly lowering the temperature of the battery cells 100 overheated by charging/discharging.

Additionally, to stop the propagation of a fire occurring in one or some of the battery cells 100 to the adjacent battery cells 100, the upper plate 210 and the lower plate 220 of the module case 200 according to the present disclosure have a melting spot in the first plate 211. The melting spot refers to a region of the first plate 211 that melts when heated.

The melting spot may include a first melting spot in the upper plate 210 and a second melting spot in the lower plate 220, and the first melting spot and the second melting spot may be arranged at vertically symmetric locations with at least one battery cell 100 interposed between.

More specifically, referring to FIGS. 3 and 4, the first melting spot may include a through-hole 212 in the thicknesswise direction of the first plate 211 and a second sealing cap 213 made of a thermomeltable material. The through-hole 212 and the second sealing cap 213 may be provided at a predetermined interval along the channel F in the upper plate 210.

In the same way as the first melting spot, the second melting spot may include a through-hole and a second sealing cap 223, and may be provided at a predetermined interval along the channel F in the lower plate 220.

Figure 5:
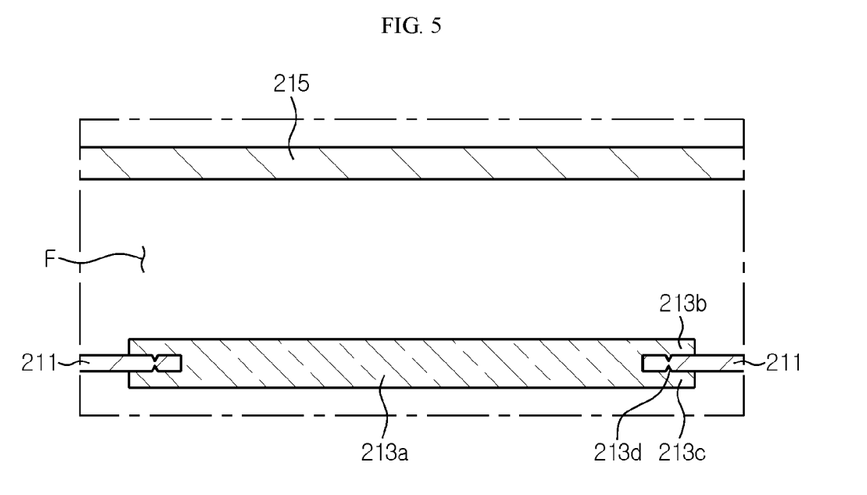
FIG. 5 is a partial enlarged view of FIG. 4.

As shown in FIG. 5, the second sealing cap 213 may include a body 213a which is disposed in the through-hole 212 and a top flange 213b and a bottom flange 213c horizontally extended from the top and bottom of the body 213a to cover an upper surface and a lower surface of the first plate 211, respectively.

Additionally, the top flange 213b and the bottom flange 213c may have at least one protrusion 213d in a direction facing each other and the first plate 211 may have a groove of a shape that matches the protrusion 213d. In particular, the protrusion 213d may be in a knife edge shape, i.e., a triangular shape in cross section. In addition to the knife edge shape of this embodiment, for example, the protrusion 213d may be in trapezoidal, rectangular and semicircular shapes.

In this embodiment, the protrusion 213d of the knife edge shape is applied to the top flange 213b and the bottom flange 213c to enhance the sealability and the coupling strength of the second sealing cap 213.

The material of the second sealing cap 213 may include a plastic resin such as polyethylene (PE) or polypropylene (PP). For example, the plastic second sealing cap 213 and the aluminum first plate 211 may be integrally formed by insert molding. Meanwhile, the scope of protection of the present disclosure is not limited to the second sealing cap 213 made of the plastic material. That is, the second sealing cap 213 may be made of any other material, for example, rubber having thermomeltability and sealability.

Figure 6:
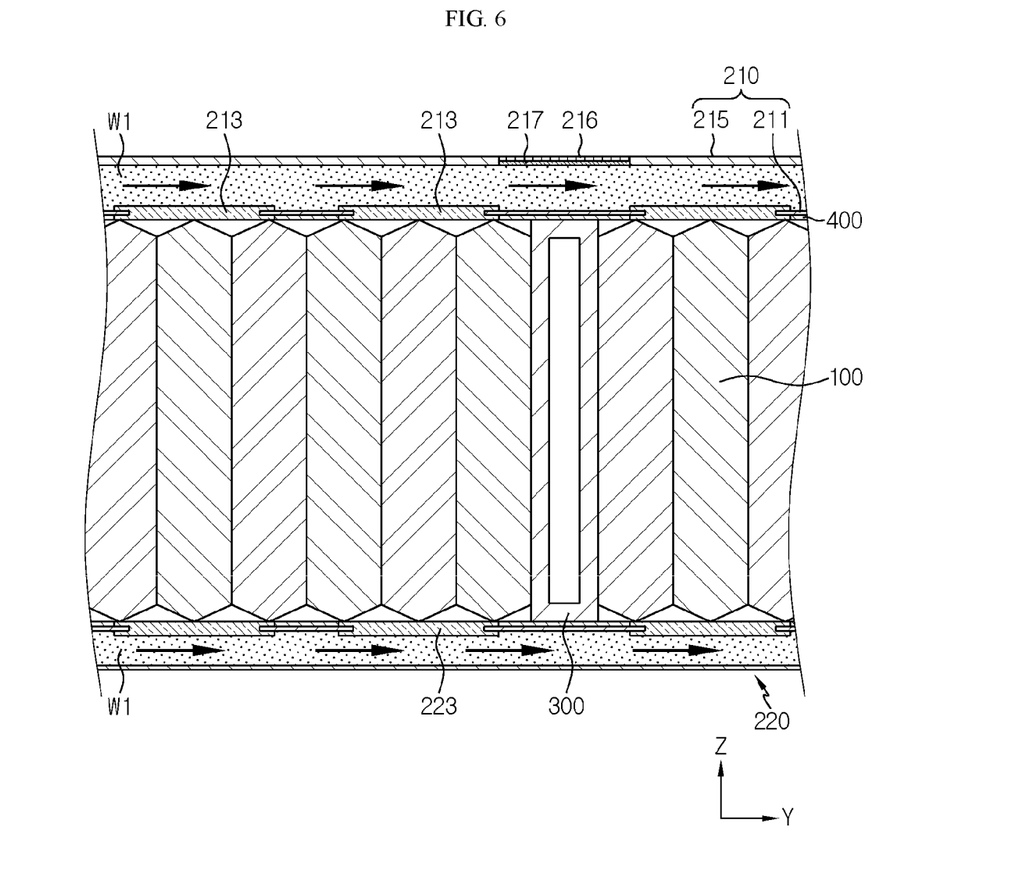
FIG. 6 is a diagram illustrating a cooling structure of a battery module according to an embodiment of the present disclosure.

FIG. 6 is a diagram illustrating the cooling structure of the battery module 10 according to an embodiment of the present disclosure.

In the battery module 10 according to this embodiment, the through-hole 212 of the first plate 211 is sealed by the second sealing cap 213 in normal condition as shown in FIG. 6. Accordingly, the coolant W1 of the upper plate 210 and the lower plate 220 does not permeate into the battery cells 100 through the through-hole 212 and absorbs the heat of the battery cells 100 while the coolant W1 flows along the channel F.

As described above, the first plate 211 is made of aluminum to transfer the heat of the battery cells 100 to the coolant W1 fast. To increase the heat transfer rate, a heat transfer material 400 may be positioned on one surface of the first plate 211 in contact with the battery cells 100 or a space between the edge of the battery cells 100 and one surface of the first plate 211 may be filled with a thermally conductive resin.

Figure 7:
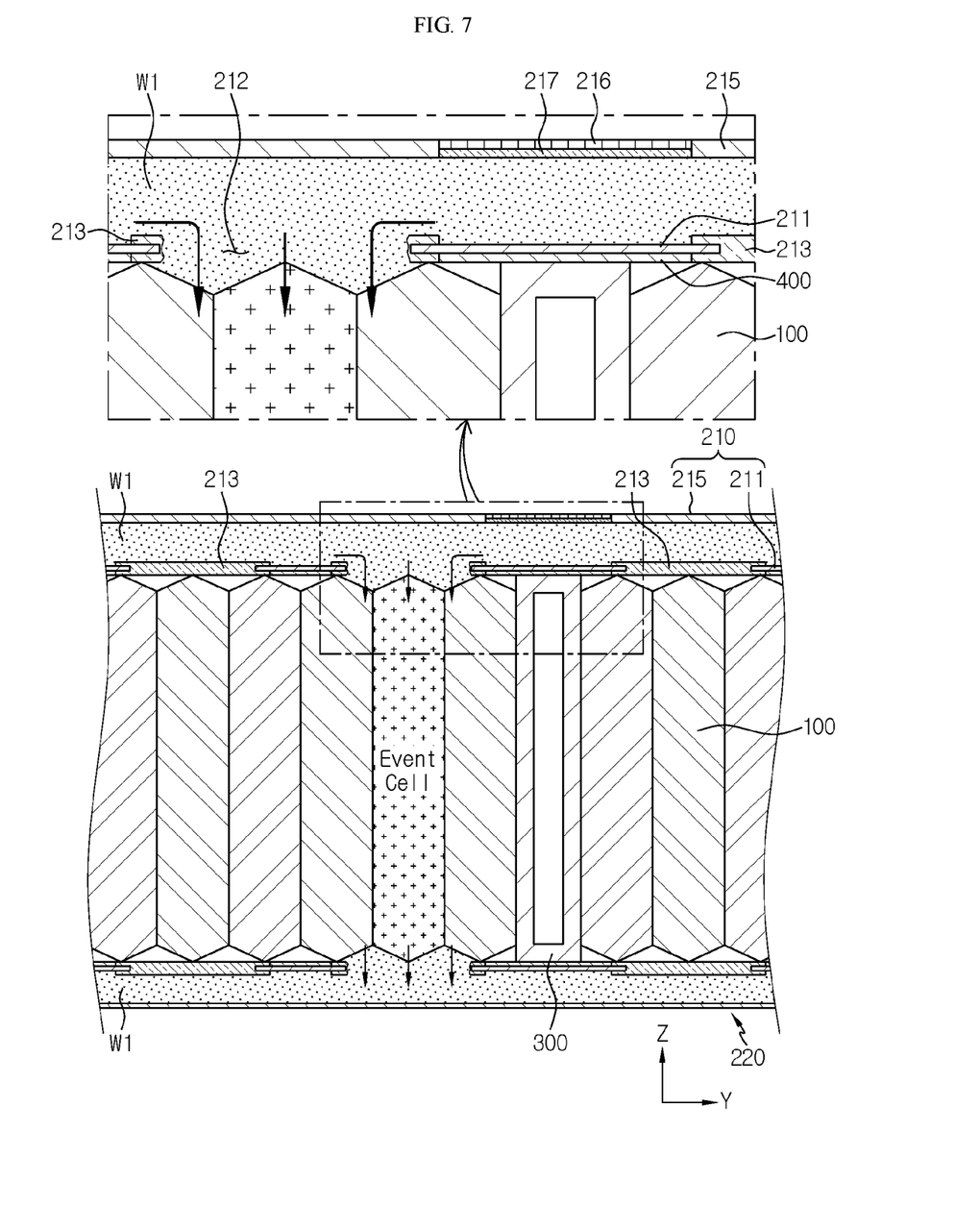
FIG. 7 is a diagram illustrating a fire extinguishing situation when a fire occurs in a specific battery cell in a battery module according to an embodiment of the present disclosure.

FIG. 7 is a diagram illustrating a fire extinguishing situation when a fire occurs in the specific battery cell 100 in the battery module 10 according to an embodiment of the present disclosure.

When the temperature of a certain battery cell 100 among the battery cells 100 is abnormally high or a fire occurs, the second sealing cap 213 disposed on and below the corresponding battery cell 100 may melt by heat and high temperature gas or sparks generated from the corresponding battery cell 100 as shown in FIG. 7. Accordingly, the second sealing cap 213 may cease to exist and the coolant W1 of the upper plate 210 may be immediately fed into the corresponding battery cell 100 through the opened through-hole 212 in the channel F.

In other words, when the second sealing cap 213 disposed on the battery cell 100 in which the fire occurred melts, the coolant W1 may be fed directly from above the corresponding battery cell 100. Accordingly, it is possible to stop the fire occurred in the battery cell 100 quickly and prevent thermal propagation to the adjacent battery cells 100.

Figure 8:
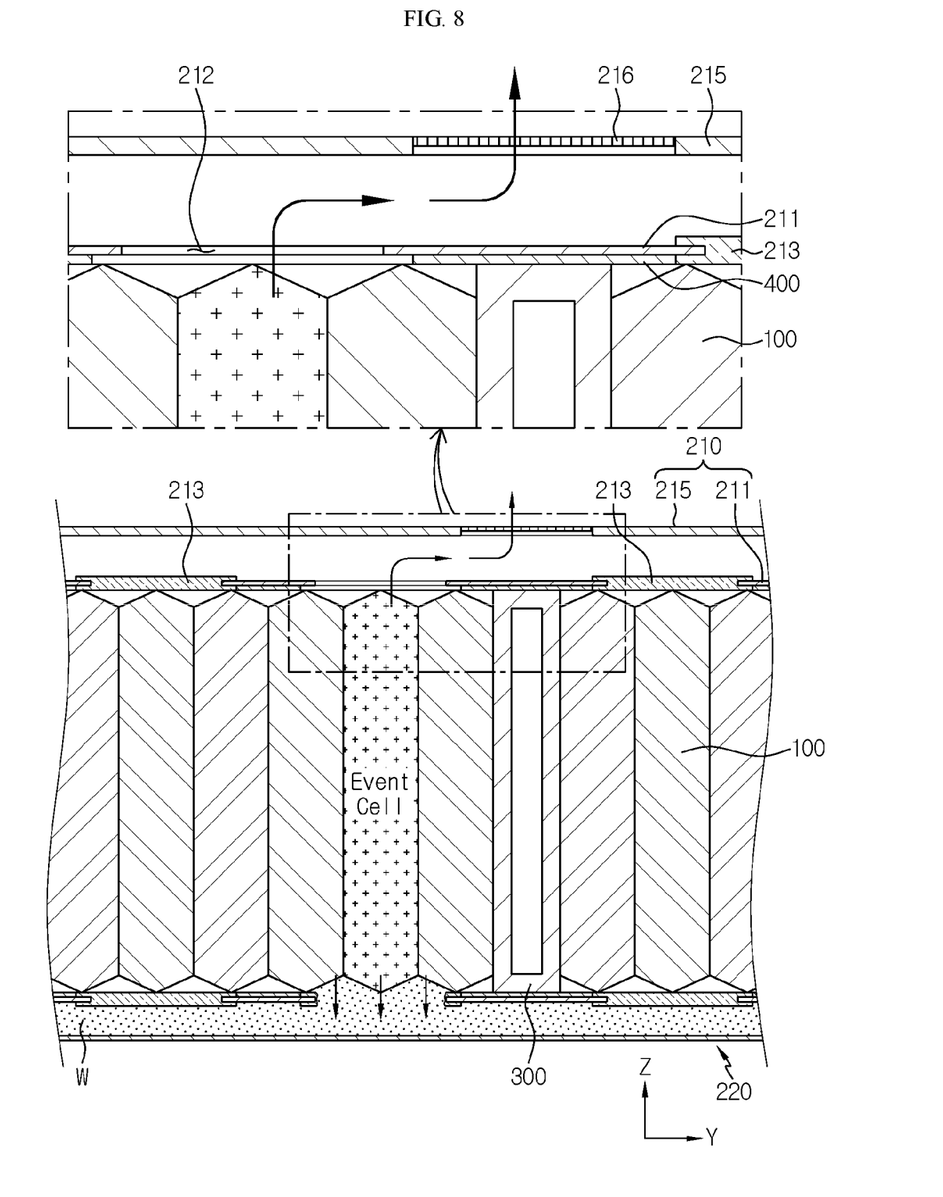
FIG. 8 is a diagram illustrating a gas exit situation of a specific battery cell in a battery module according to an embodiment of the present disclosure.

FIG. 8 is a diagram illustrating a gas exit situation of the specific battery cell 100 in the battery module 10 according to an embodiment of the present disclosure.

High temperature gas generated from the battery cell 100 in which the fire occurred and blazing flames with the gas may be the cause of fire propagation. To protect the adjacent battery cells 100 from the high temperature gas and flames, the module case 200 according to this embodiment has the vent hole 216 in the second plate 215 of the upper plate 210 as shown in FIG. 8.

More specifically, referring to FIGS. 2 and 8 together, at least one vent hole 216 may be formed over a region of the second plate 215 along the channel F.

In particular, the vent hole 216 may be provided with a mesh structure. The vent hole 216 of this embodiment is formed by processing a region of the second plate 215 into a mesh structure. In an alternative example of the vent hole 216, an opening may be formed in the second plate 215 and a mesh or a cover of a mesh structure may be installed in the opening.

As shown in FIGS. 6 and 7, the vent hole 216 may be sealed by a first sealing cap 217 made of a thermomeltable material. Accordingly, in the case of the battery module 10 in normal condition, the vent hole 216 is closed, so the coolant W1 in the channel F does not leak out of the module case 200. Additionally, there is no risk that impurities from the outside of the module case 200 go into the vent hole 216.

However, in case that a fire occurs in the battery cell 100, when the coolant W1 is fed into the battery cell 100 through the through-hole 212 from the channel F of the upper plate 210 as shown in FIG. 8, an empty space is formed in the channel F of the upper plate 210. The channel F of the upper plate 210 at that time may be used as a gas exit path. The high temperature gas and flames move along the channel F of the upper plate 210 through the opened through-hole 212 and melt the first sealing cap 217. After the first sealing cap 217 ceases to exist, when the vent hole 216 is opened, the high temperature gas may be forced out through the vent hole 216 at a high speed by a pressure difference between the inside and outside of the module case 200. In this instance, the flames or sparks may cease to exist as the temperature becomes lower while the flames or sparks move along the channel F or may be filtered out by the vent hole 216 of the mesh structure. Accordingly, it is possible to prevent the propagation of flames or sparks and quickly force gas out.

Subsequently, a variation of this embodiment will be described with reference to the accompanying drawings.

Figure 9:
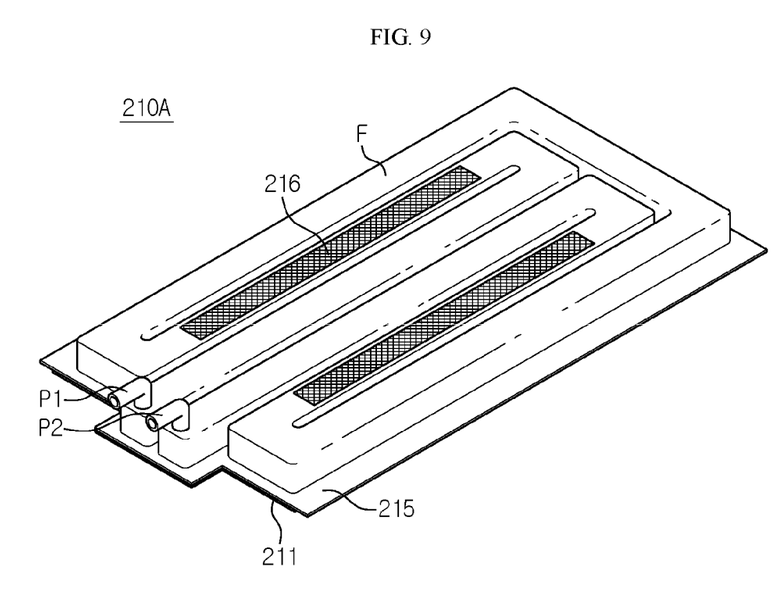
FIG. 9 is a diagram showing a variation of the upper plate of the module case of FIG. 2.
Figure 10:
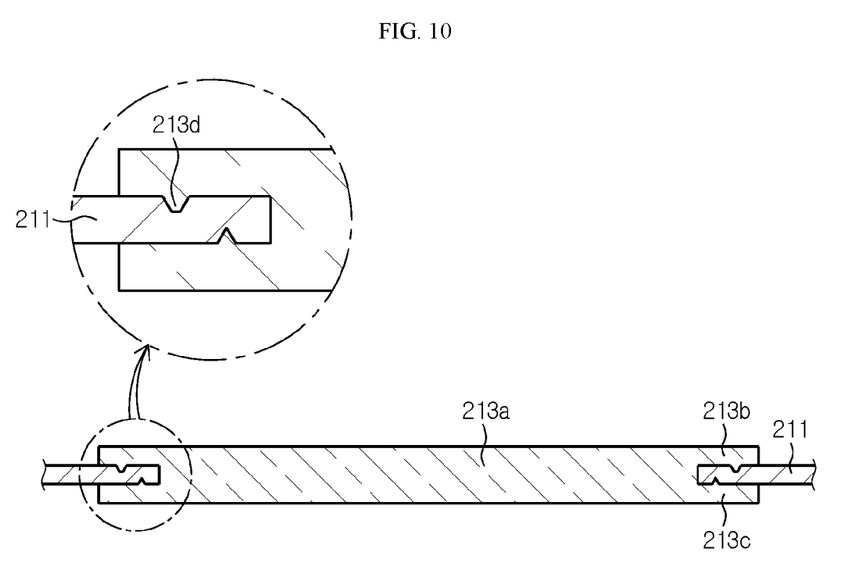
FIGS. 10 and 11 are diagrams showing variations of a second sealing cap of FIG. 5.
Figure 11:
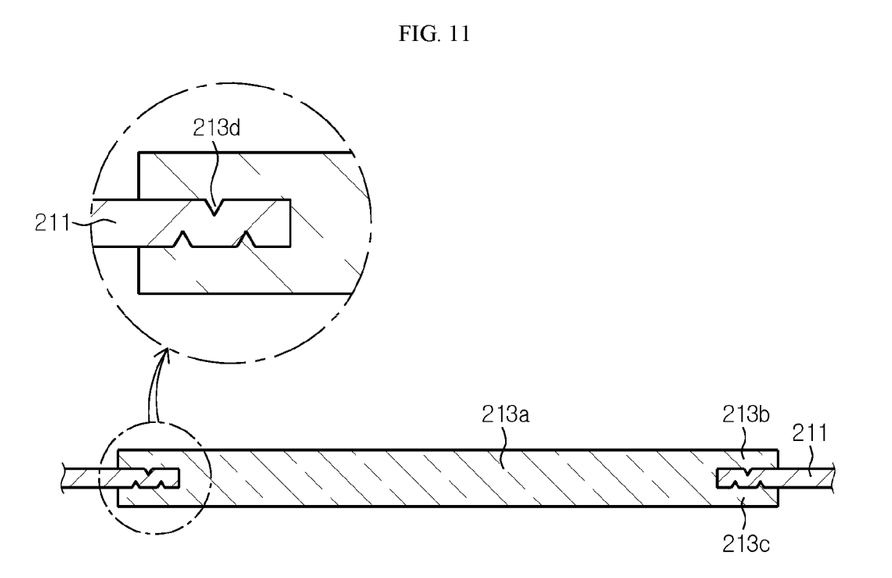

FIG. 9 is a diagram showing a variation of the upper plate 210 of the module case 200 of FIG. 2, and FIGS. 10 and 11 are diagrams showing variations of the second sealing cap 213 of FIG. 5.

The same reference number as the previous drawings indicates the same element, and an overlapping description of the same element is omitted and it will be briefly described based on different(s) between this embodiment and the above-described embodiment.

Referring to FIG. 9, the upper plate 210A of the module case 200 according to this variation has the vent hole 216 extended in the lengthwise direction longer than the vent hole 216 of FIG. 5. It is possible to force a large amount of gas out more smoothly and quickly by expanding the vent hole 216.

Subsequently, FIGS. 10 and 11 are diagrams showing variations of the second sealing cap 213, respectively, and as shown in FIGS. 10 and 11, the shape, number and position of the protrusion 213$d$ may be variously provided for the optimized sealing area and the enhanced coupling strength between the second sealing cap 213 and the first plate 211.

By the components and operation of the battery module 10 according to the present disclosure as described hereinabove, the cooling performance of the battery cells 100 is very good, and when a fire occurs in the battery cell 100, the coolant W1 may be immediately fed into the corresponding battery cell 100, thereby effectively preventing thermal propagation in the battery module 10. Additionally, gas, flames and sparks generated from the battery cell 100 in which the fire occurred may be guided by the channel F of the upper plate 210, and gas may be forced out while preventing the spread of flames and sparks.

Meanwhile, a battery pack (not shown) according to the present disclosure may include at least one battery module. In addition to the battery module, the battery pack may further include a pack case (not shown) accommodating the battery module and a variety of devices (not shown) for controlling the charge/discharge of the battery module, for example, a Battery Management System (BMS), a current sensor, a fuse or the like.

While the present disclosure has been hereinabove described with regard to a limited number of embodiments and drawings, the present disclosure is not limited thereto and a variety of modifications and changes may be made thereto by those skilled in the art within the technical aspects of the present disclosure and the scope of the appended claims and equivalents thereof.

The terms indicating directions as used herein such as upper, lower, left and right are used for convenience of description only, and it is obvious to those skilled in the art that the term may change depending on the position of the stated element or an observer.

What is claimed is:

1. A battery module, comprising:
a plurality of battery cells; and
a module case accommodating the plurality of battery cells,
wherein the module case includes:
an upper plate positioned on the plurality of battery cells and a lower plate positioned below the plurality of battery cells, each of the upper plate and lower plate have a first plate and a second plate forming a channel in which a coolant flows,
wherein each of the upper plate and the lower plate include a melting spot which melts when heated in the first plate, wherein the upper plate includes a vent hole and a first sealing cap in the second plate through which gas is forced out, and wherein the first sealing cap is configured to seal the vent hole and is made of a thermomeltable material.

2. The battery module according to claim 1, wherein the vent hole is provided with a mesh structure.

3. The battery module according to claim 1, wherein the vent hole is formed over a region along the channel in the second plate.

4. The battery module according to claim 1, wherein the upper plate and the lower plate comprise a heatsink.

5. The battery module according to claim 4, wherein the first plate and the second plate are made of aluminum (Al), or the first plate is made of aluminum (Al) and the second plate is made of steel.

6. The battery module according to claim 1, wherein the melting spot includes a first melting spot in the upper plate and a second melting spot in the lower plate, and wherein the first melting spot and the second melting spot are arranged at vertically symmetric locations with the at least one battery cell interposed between.

7. The battery module according to claim 1, wherein the melting spot includes a through-hole in the first plate and a second sealing cap configured to seal the through-hole and made a thermomeltable material, and wherein the through-hole and the second sealing cap are provided at a predetermined interval along the channel.

8. The battery module according to claim 7, wherein the second sealing cap includes:

a body which is disposed in the through-hole; and a top flange and a bottom flange horizontally extended from top and bottom of the body to cover an upper surface and a lower surface of the first plate, respectively.

9. The battery module according to claim 8, wherein the top flange and the bottom flange have at least one protrusion in a direction facing each other, and wherein the first plate has a groove of a shape which matches the protrusion.

10. The battery module according to claim 9, wherein the protrusion has any one of a triangular, trapezoidal, rectangular and semicircular cross section.

11. A battery pack comprising at least one battery module according to claim 1.

12. The battery module according to claim 1, further comprising a coolant inlet and a coolant outlet in the upper plate.

* * * * *